United States Patent
Inaba

(10) Patent No.: US 11,030,467 B2
(45) Date of Patent: Jun. 8, 2021

(54) SERVER DEVICE AND IN-VEHICLE DEVICE

(71) Applicant: TOYOTA JIDOSHA KABUSHIKI KAISHA, Toyota (JP)

(72) Inventor: Chihiro Inaba, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 100 days.

(21) Appl. No.: 16/188,665

(22) Filed: Nov. 13, 2018

(65) Prior Publication Data
US 2019/0147256 A1 May 16, 2019

(30) Foreign Application Priority Data

Nov. 14, 2017 (JP) .............................. JP2017-219387

(51) Int. Cl.
*G06K 9/00* (2006.01)
*H04L 29/08* (2006.01)
(Continued)

(52) U.S. Cl.
CPC ..... *G06K 9/00805* (2013.01); *G06K 9/00671* (2013.01); *G06K 9/00791* (2013.01); *G06K 9/00973* (2013.01); *G06K 9/6227* (2013.01); *G06T 7/70* (2017.01); *H04L 67/10* (2013.01); *H04L 67/125* (2013.01); *H04L 67/18* (2013.01);
(Continued)

(58) Field of Classification Search
CPC ............ G06K 9/00805; G06K 9/00671; H04L 67/10; G06T 7/70
See application file for complete search history.

(56) References Cited

U.S. PATENT DOCUMENTS

| 2014/0270548 | A1 | 9/2014 | Kamiya | |
| 2018/0024568 | A1* | 1/2018 | Fridman | G05D 1/0246 701/28 |
| 2019/0384295 | A1* | 12/2019 | Shashua | G08G 1/09623 |

FOREIGN PATENT DOCUMENTS

| JP | 2005259031 A | 9/2005 |
| JP | 2015-130093 A | 7/2015 |

(Continued)

OTHER PUBLICATIONS

J. Dean et al, "MapReduce: Simplified Data Processing on Large Clusters", OSDI 2004, pp. p. 1-p. 13.
(Continued)

*Primary Examiner* — Ruiping Li
(74) *Attorney, Agent, or Firm* — Hunton Andrews Kurth LLP

(57) ABSTRACT

In a server device, a specifying part is configured to, based on information acquired from a plurality of vehicles, specify a distribution target vehicle to which an image recognition logic for image recognition of a predetermined object is to be distributed, among the plurality of vehicles. A distribution part is configured to distribute the image recognition logic to the distribution target vehicle specified by the specifying part. An acquisition part is configured to acquire information on the predetermined object from the distribution target vehicle to which the image recognition logic has been distributed, the information on the predetermined object being recognized by executing the image recognition logic on a captured out-of-vehicle image of the distribution target vehicle.

5 Claims, 7 Drawing Sheets

(51) Int. Cl.
*H04W 4/40* (2018.01)
*G06T 7/70* (2017.01)
*G06K 9/62* (2006.01)

(52) U.S. Cl.
CPC ..... *H04W 4/40* (2018.02); *G06T 2207/30261* (2013.01)

(56) References Cited

FOREIGN PATENT DOCUMENTS

KR  10-2012-0122424 A  11/2012
KR  10-2012-0107317 A  10/2014

OTHER PUBLICATIONS

International Business Machines Corporation (IBM), "MQTT V3.1 Protocol Specification", Eurotech, 1999, pp. p. 1-p. 42.

* cited by examiner

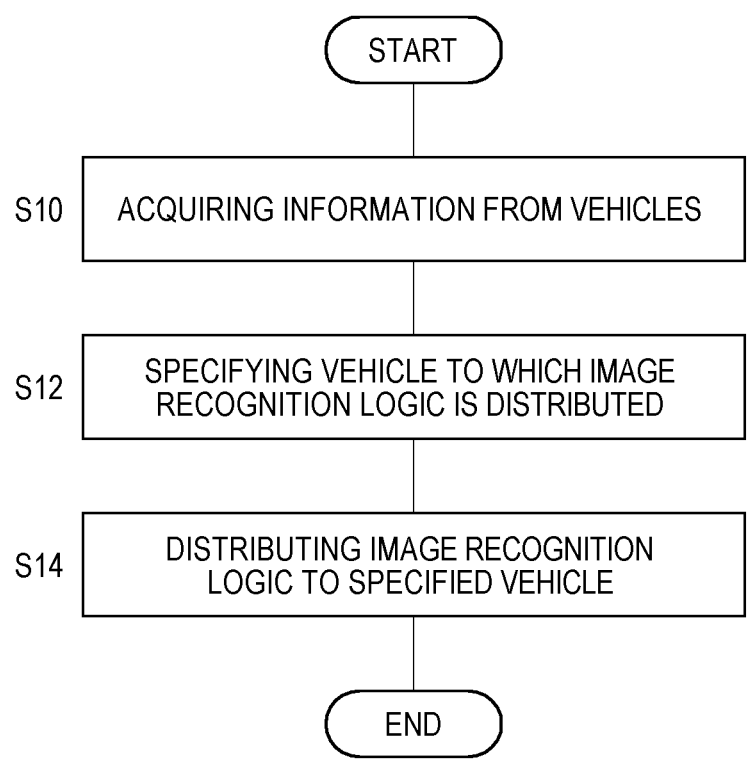

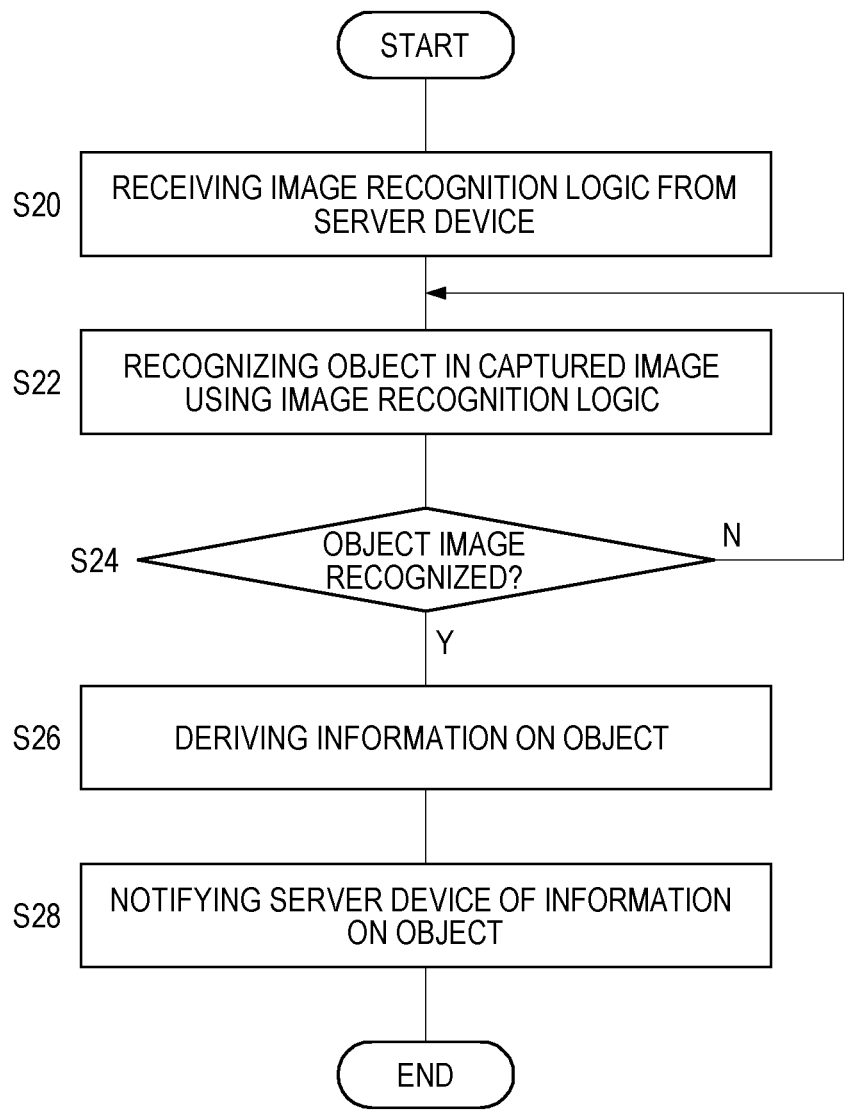

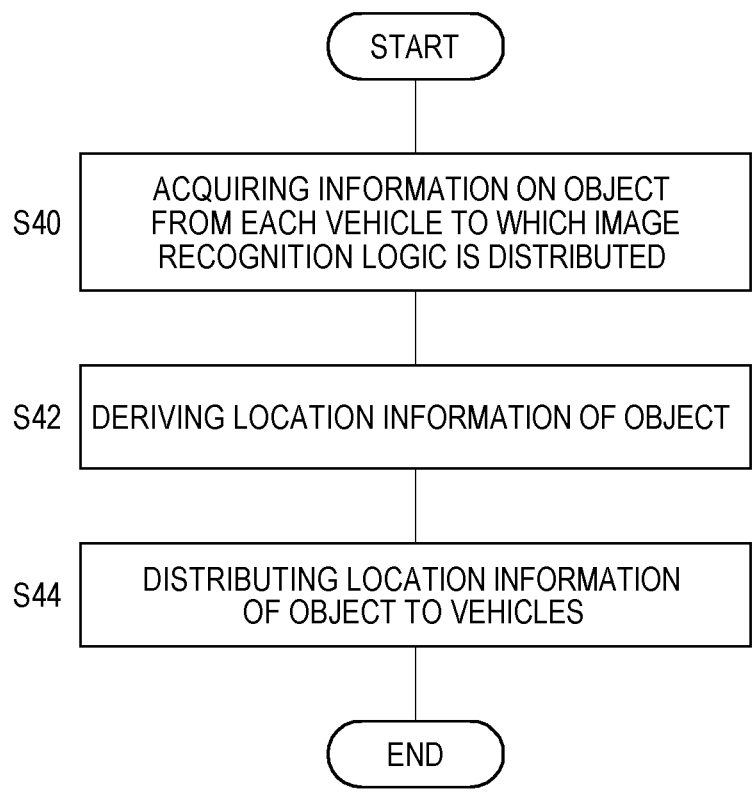

FIG. 7A

| VEHICLE | PROCESSOR TYPE |
|---|---|
| Vehicle001 | A |
| Vehicle002 | B |
| ⋮ | ⋮ |

FIG. 7B

| IMAGE RECOGNITION LOGIC | PROCESSOR TYPE |
|---|---|
| Data001-A | A |
| Data001-B | B |
| Data002-A | A |
| Data002-B | B |
| ⋮ | ⋮ |

FIG. 7C

| SPECIFIED VEHICLE | IMAGE RECOGNITION LOGIC TO BE DISTRIBUTED |
|---|---|
| Vehicle001 | Data001-A |
| Vehicle002 | Data001-B |

SERVER DEVICE AND IN-VEHICLE DEVICE

INCORPORATION BY REFERENCE

The disclosure of Japanese Patent Application No. 2017-219387 filed on Nov. 14, 2017 including the specification, drawings and abstract is incorporated herein by reference in its entirety.

BACKGROUND

1. Technical Field

The disclosure relates to a server device and an in-vehicle device that notifies a vehicle occupant of information.

2. Description of Related Art

An algorithm for image recognition varies depending on an object to be recognized. Thus, a technique for making it easier to determine an optimum algorithm according to an object to be recognized is known (see, e.g., Japanese Unexamined Patent Application Publication No. 2015-130093 (JP 2015-130093)).

SUMMARY

There is a need for information on various objects placed at various locations be cost-effectively collected by using image recognition.

The disclosure has been made in view of such a circumstance. It is an object of the disclosure to provide a server device and an in-vehicle device capable of cost-effectively collecting information on various objects at various locations.

A first aspect of the disclosure relates to a server device including a specifying part, a distribution part, and an acquisition part. The specifying part is configured to, based on information acquired from a plurality of vehicles, specify a distribution target vehicle to which an image recognition logic for image recognition of a predetermined object is to be distributed, among the plurality of vehicles. The distribution part is configured to distribute the image recognition logic to the distribution target vehicle specified by the specifying part. The acquisition part is configured to acquire information on the predetermined object from the distribution target vehicle to which the image recognition logic has been distributed, the information on the predetermined object being recognized by executing the image recognition logic on a captured out-of-vehicle image of the distribution target vehicle.

According to the first aspect, the image recognition logic is distributed to the specified distribution target vehicle, and the information on the object recognized by executing the image recognition logic on a captured image is acquired from the distribution target vehicle. Therefore, it is possible to cost-effectively collect information on various objects at various locations without incorporating in advance the image recognition logic specialized to each object into the vehicle.

In the server device according to the first aspect, the specifying part may specify the distribution target vehicle among vehicles possibly traveling in a region related to the image recognition logic.

In the server device according to the first aspect, the specifying part may specify the distribution target vehicle among vehicles possibly traveling in the region during a period related to the image recognition logic.

In the server device according to the first aspect, the information on the predetermined object may include location information of the distribution target vehicle when the predetermined object is imaged. The server device may further include a derivation part configured to derive location information of the predetermined object based on the location information of the distribution target vehicle when the predetermined object is imaged. The distribution part may distribute the derived location information of the predetermined object to the plurality of vehicles.

In the server device according to the first aspect, when an acquisition termination condition of the information on the predetermined object is satisfied, the distribution part may distribute a deletion instruction of the image recognition logic to the distribution target vehicle to which the image recognition logic has been distributed.

In the server device according to the first aspect, the image recognition logic may be constituted by a learning network model.

A second aspect of the disclosure relates to a server device including a specifying part, a distribution part, and an acquisition part. The specifying part is configured to, based on information acquired from a plurality of vehicles, specify a plurality of distribution target vehicles to which at least one image recognition logic for image recognition of a common or identical predetermined object is to be distributed, among the plurality of vehicles. The distribution part is configured to distribute the at least one image recognition logic to the plurality of distribution target vehicles specified by the specifying part. The acquisition part is configured to acquire information on the predetermined object from the plurality of distribution target vehicles to which the at least one image recognition logic has been distributed, the information on the predetermined object being recognized by executing the at least one image recognition logic on captured out-of-vehicle images of the plurality of distribution target vehicles.

In the server device according to the second aspect, each of the plurality of vehicles may include an image recognition part configured to execute the at least one image recognition logic. The server device may further include a storage part configured to store a plurality of image recognition logics for image recognition of the common or identical object, the plurality of image recognition logics being executable by different types of image recognition parts. The distribution part may distribute, to each of the plurality of distribution target vehicles specified by the specifying part, one image recognition logic that is executable by the image recognition part of a corresponding one of the plurality of distribution target vehicles, among the plurality of image recognition logics stored in the storage part.

A third aspect of the disclosure relates to an in-vehicle device including a reception part, an image recognition part, a derivation part, and a notification part. The reception part is configured to receive an image recognition logic for image recognition of a predetermined object from a server device. The image recognition part is configured to recognize the predetermined object in a captured out-of-vehicle image of a vehicle on which the in-vehicle device is mounted by executing the image recognition logic received by the reception part. The derivation part is configured to derive information on the predetermined object based on an image recognition result obtained in the image recognition part.

The notification part is configured to notify the server device of the information on the predetermined object derived by the derivation part.

According to the third aspect, the image recognition logic is received from the server device, the information on the object is derived based on the image recognition result obtained by executing the image recognition logic, and the information on the object is notified to the server device. Therefore, it is possible to cost-effectively collect information on various objects at various locations without incorporating in advance the image recognition logic specialized to each object into the vehicle.

According to the disclosure, it is possible to cost-effectively collect information on various objects at various locations.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a flowchart showing a distribution process of image recognition logic in the server device of FIG. 1;

FIG. 5 is a flowchart showing an image recognition process in the in-vehicle device of FIG. 1;

FIG. 6 is a flowchart showing a process of acquiring information on an object in the server device of FIG. 1;

FIG. 7A is a diagram showing a data structure of a first table stored in a storage part of a server device according to a second embodiment;

FIG. 7B is a diagram showing a data structure of a second table stored in the storage part; and FIG. 7C is a diagram showing a data structure of a third table stored in the storage part.

DETAILED DESCRIPTION OF EMBODIMENTS

First Embodiment

Figure 1:
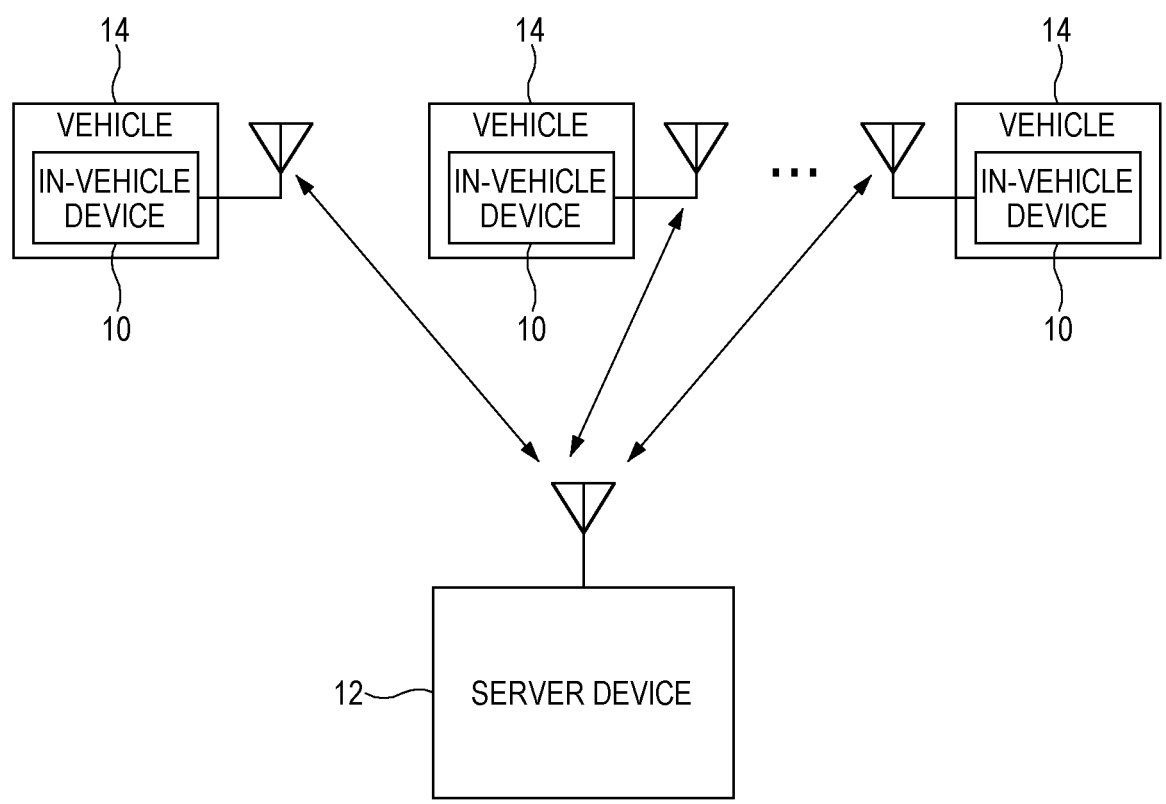
FIG. 1 is a block diagram showing a configuration of a vehicle system according to a first embodiment.

FIG. 1 is a block diagram showing a configuration of a vehicle system 1 according to a first embodiment. The vehicle system 1 includes a plurality of in-vehicle devices 10 and a server device 12. In FIG. 1, three in-vehicle devices 10 among a plurality of in-vehicle devices 10 are illustrated.

The in-vehicle device 10 is mounted on a vehicle 14 that is an automobile. The in-vehicle device 10 performs wireless communication with the server device 12. The standard of wireless communication includes, but is not particularly limited to, for example, 3rd generation mobile communication system 3G), 4th generation mobile communication system (4G), 5th generation mobile communication system (5G), and Wi-Fi (IEEE 802.11 standard). The in-vehicle device 10 may perform wireless communication with the server device 12 via a base station (not shown). The server device 12 is installed in a data center, for example, and functions as an information processing device that processes information transmitted from a plurality of in-vehicle devices 10.

Figure 2:
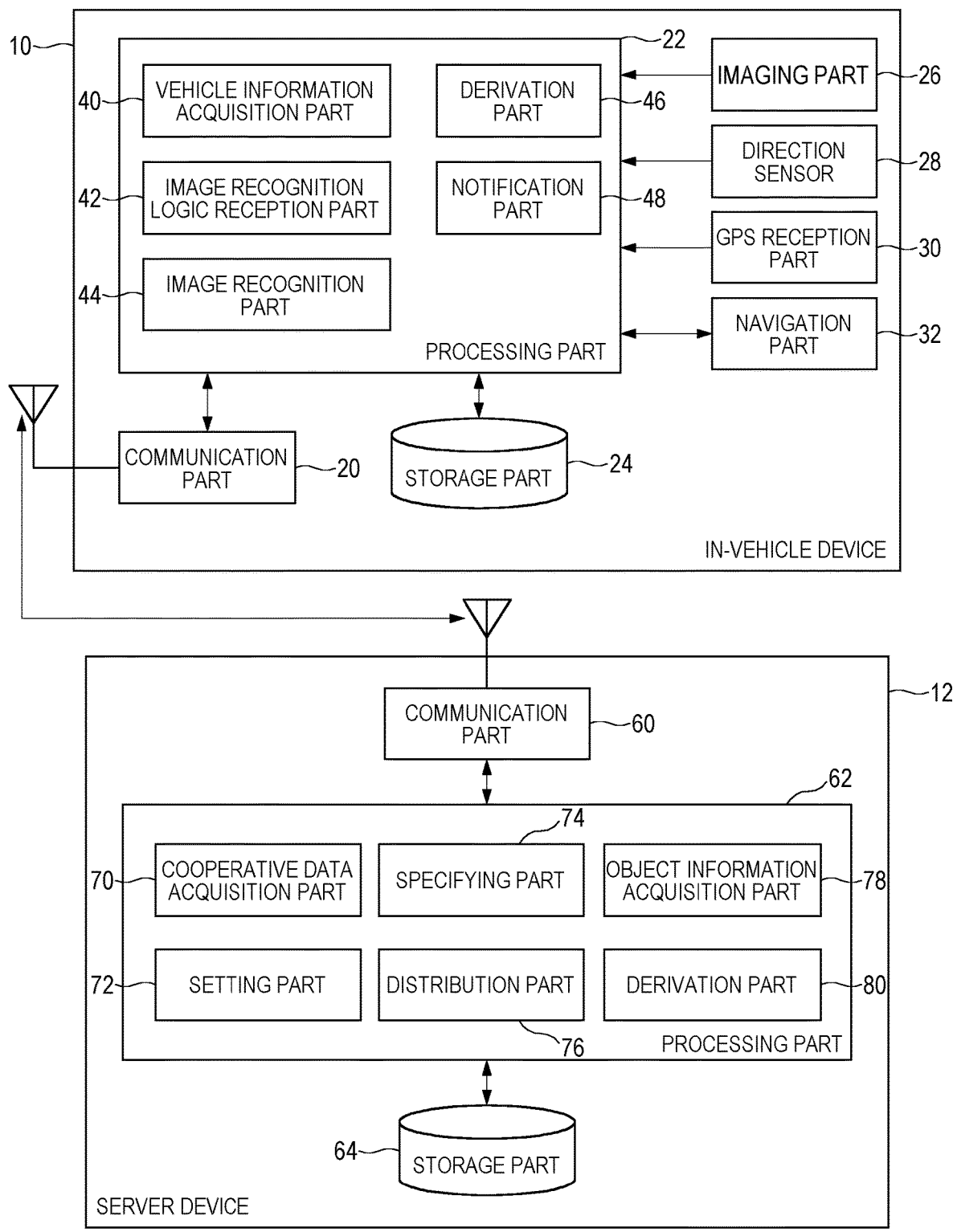
FIG. 2 is a block diagram showing configurations of an in-vehicle device and a server device shown in FIG. 1.

FIG. 2 is a block diagram showing the configurations of the in-vehicle device 10 and the server device 12 shown in FIG. 1. The in-vehicle device 10 includes a communication part 20, a processing part 22, a storage part 24, an imaging part 26, a direction sensor 28, a GPS reception part 30, and a navigation part 32. The processing part 22 includes a vehicle information acquisition part 40, an image recognition logic reception part 42, an image recognition part 44, a derivation part 46, and a notification part 48.

The server device 12 includes a communication part 60, a processing part 62, and a storage part 64. The processing part 62 includes a cooperative data acquisition part 70, a setting part 72, a specifying part 74, a distribution part 76, an object information acquisition part 78, and a derivation part 80.

Description will now be given in the order of (1) a distribution process of image recognition logic, (2) an image recognition process, and (3) an acquisition process of information of an object.

(1) Distribution Process of Image Recognition Logic

First, the in-vehicle device 10 will be described. The vehicle information acquisition part 40 periodically acquires information on the subject vehicle. The information on the subject vehicle includes, for example, location information of the subject vehicle and direction information indicating a traveling direction of the subject vehicle.

The vehicle information acquisition part 40 acquires the location information from, for example, the GPS reception part 30. The vehicle information acquisition part 40 acquires direction information from, for example, the GPS reception part 30 or the direction sensor 28. An acquired time may be attached to the location information and the direction information, or the time at which the server device 12 has received the location information and the direction information may be regarded as the acquired time. A frequency at which the vehicle information acquisition part 40 acquires the information on the subject vehicle may be appropriately determined by experiments or the like. The frequency at which the vehicle information acquisition part 40 acquires the information on the subject vehicle may be different for each type of information.

The vehicle information acquisition part 40 outputs the location information and set route information to the communication part 20. The vehicle information acquisition part 40 outputs the location information and the direction information to the derivation part 46. The location information and the direction information output to the derivation part 46 are used in (2) the image recognition process to be described later.

The communication part 20 communicates with the server device 12. The communication part 20 may be configured to communicate with the server device 12 via a public communication network (3G, 4G, 5G, Wi-Fi, and the like) used in a mobile phone. The communication part 20 periodically transmits the location information and the set route information acquired by the vehicle information acquisition part 40 to the server device 12. Such information is attached to identification information for identifying the vehicle 14 as a transmission source. A frequency of transmitting information may be appropriately determined by experiments or the like.

The server device 12 will be described. The storage part 64 stores a plurality of image recognition logics. Each of the image recognition logics is configured to recognize an image of a predetermined object and is optimized so as to increase recognition accuracy of the object. The image recognition logic may be constructed using well-known techniques. An example of the image recognition logic is a neural network model. One example of the neural network model is a data structure including an input, output, a network structure, and a network weight of a multilayer neural network. In this case, the network weight is properly approximated so that a desired object can be recognized suitably. A captured image is input to the neural network through a feature amount extraction step. Another example of the image recognition logic is a program executed by a general-purpose processor, in which an image recognition algorithm is mounted.

The object is an object that can be imaged by the imaging part 26 mounted on the vehicle 14 and that is expected to be recognized by the image recognition part 44 using the image recognition logic. The object includes, but is not particularly limited to, for example, various flowers, such as a dandelion flower and a sunflower, troubled vehicles, falling objects on a road, dents on a road, flooded roads, frozen roads, snow-removed roads, people, a person with an umbrella, and the like. If the object is a flower, the image recognition logic may be configured to recognize that multiple flowers are blooming.

A region (a concept including a wide area such as the west coast, the east coast, or the east sea region, a municipality such as a state or a city or the like, a predetermined road such as the national highway No. 1, and the like) is associated with each of the image recognition logics. A period (a concept including start date and time, end date and time, and the like) may be associated with each of the image recognition logics. An expiration date (effective time or effective days) may be associated with each of the image recognition logics. A priority (a concept including a priority regarding a processing speed or a processing precision) may be associated with each of the image recognition logics.

For example, multiple sets of regions and periods in which dandelion flowers may be blooming over a wide range are associated with the image recognition logic for dandelion flowers. The regions and the periods may be, for example, a region A1 and a period from March 1 to March 20, a region A2 and a period from March 10 to March 30, a region A3 and a period from March 20 to April 10, and so forth. Similarly, multiple sets of regions and periods are associated with the image recognition logic for other flowers.

Regions along expressways, national highways, and the like are associated with the image recognition logic for troubled vehicles. Regions along expressways, national highways, and the like are associated with the image recognition logic for falling objects on a road. Regions where dents are likely to be generated on a road are associated with the image recognition logic for dents on a road.

Regions and periods in which roads are likely to freeze are associated with the image recognition logic for frozen roads. Regions and periods in which snow accumulation is likely to occur are associated with the image recognition logic for snow-removed roads.

The communication part 60 performs wireless communication with the communication parts 20 of the plurality of in-vehicle devices 10. The communication part 60 receives the location information and the set route information of the plurality of vehicles 14 from the communication parts 20 of the plurality of in-vehicle devices 10. The communication part 60 outputs the location information and the set route information of the plurality of vehicles 14 to the specifying part 74.

Based on the information acquired from the plurality of vehicles 14, the specifying part 74 periodically specify, with respect to the respective image recognition logics stored in the storage part 64, one or more vehicles 14 to which the image recognition logics are to be distributed. The maximum number of vehicles 14 to which the image recognition logics are distributed may be determined in advance.

The specifying part 74 specifies the vehicle 14 based on the information related to the image recognition logic. Specifically, the specifying part 74 specifies the vehicle 14 using the region related to the image recognition logic and the period related to the image recognition logic.

The specifying of the vehicle 14 using the region related to the image recognition logic will be described. As an example, based on the set route information of the plurality of vehicles 14, the specifying part 74 specifies one or more vehicles 14 possibly travelling in the region related to the image recognition logic. The specifying part 74 specifies the vehicle 14 having a set route passing through the region associated with the image recognition logic as the vehicle 14 possibly travelling in the region.

As another example, the specifying part 74 may specify the vehicle without using the set route information. Specifically, the specifying part 74 specifies a frequently travelling region of each vehicle 14 from a history of the location information of each vehicle 14, and specifies the vehicle 14 having the frequently traveling region overlapping with the region related to the image recognition logic as the vehicle 14 possibly travelling in the region related to the image recognition logic. This is because the frequently travelling region of each vehicle 14 is expected to be the vicinity of a home, a living area, or a commuting route, and because the possibility of travelling through the frequently travelling region is high in the future. A specific method of specifying a vehicle traveling frequently through a target area may be configured to specify, for example, a vehicle in which the number of times of traveling in the region related to the image recognition logic during the past N days (N is a natural number) is equal to or larger than a predetermined threshold value (more than 80% against N, and the like).

As a further example, the specifying part 74 may previously store a vehicle corresponding to the region related to the image recognition logic. For example, when the region related to the image recognition logic is "Tokyo 23 Wards", the vehicles having the car license plates of Shinagawa, Nerima, Suginami, Setagaya, and Adachi may be specified as vehicles possibly traveling in the region related to image recognition logic.

The specifying part 74 may adopt either a vehicle specifying process using the set route information or a vehicle specifying process without using the set route information, or may adopt both the two vehicle specifying processes to specify vehicles. Further, a set of vehicles obtained by thinning down a set of vehicles 14 specified by the aforementioned method may be used as finally specified vehicles 14.

When a period is associated with the image recognition logic, the specifying part 74 specifies one or more vehicles 14 possibly travelling in the region related to the image recognition logic during the period. The specifying part 74 specifies the vehicle 14 having a possibility of travel in the region associated with the image recognition logic and having expected date and time of travel in the region that is included in the period related to the image recognition logic, as the vehicle 14 possibly travelling the region during the period.

The specifying part 74 stores information for identifying the specified vehicle 14 in the storage part 64 in association the information of the image recognition logic. Based on the information stored in the storage part 64, the specifying part 74 may specify the vehicle 14 to which the image recognition logic is to be distributed, so that the image recognition logic is not distributed to the vehicle 14 beyond the processing capability of the vehicle 14. The upper limit of the processing capability of the vehicle 14 may be, for example, the number (upper limit number) of image recognition logics that are distributed to the vehicle 14 and are operating. The upper limit number is, for example, one, but may be two or more according to the processing capability of the image recognition part 44. Alternatively, the upper limit of the processing capability may be, for example, a processing request amount of the image recognition logic to the image recognition part 44, specifically, a size of the neural network. The specifying part 74 may be set in advance not to specify the vehicle 14 in which the processing request amount exceeds the upper limit of the processing capability of the image recognition part 44 of the vehicle 14.

The cooperative data acquisition part 70 periodically acquires cooperative data from another server device (not shown) via the Internet or the like, and outputs the acquired cooperative data to the specifying part 74. The cooperative data may include any one of traffic information, entertainment information, disaster information, construction information, and weather data. The cooperative data is data that represents an event occurring in a certain period or date and time in the future in a certain region or an event currently occurring in the certain region. For example, the weather data includes weather information of a plurality of regions at the current date and time, and information of weather forecast of a plurality of regions after the current date and time.

The specifying part 74 may distribute the image recognition logic selected based on the event associated with the cooperative data, to the vehicle 14 selected based on the region and period associated with the cooperative data. For example, when the cooperative data is weather data, the specifying part 74 may specify the vehicle 14 so that, based on the weather data that there will be a heavy rain in a region B during a period A, the image recognition logic for a flooded road is distributed to vehicles travelling in the region B during the period A. The specifying part 74 may specify the vehicle 14 so that, based on the weather data that the temperature will be below a freezing point in a region D during a period C, the image recognition logic for a frozen road is distributed to vehicles traveling in the region D during the period C.

The distribution part 76 reads out the information for identifying one or more vehicles 14 specified by the specifying part 74 and the image recognition logic from the storage part 64, and outputs them to the communication part 60. The communication part 60 transmits the image recognition logic to one or more vehicles 14 specified by the specifying part 74. This corresponds to the fact that the distribution part 76 distributes the image recognition logic to one or more vehicles 14 specified by the specifying part 74. Such distribution is performed for each of the image recognition logics. Identification information for identifying the vehicle 14 as a transmission destination is attached to the image recognition logic.

(2) Image Recognition Process

The in-vehicle device 10 will be described. The communication part 20 receives the image recognition logic transmitted from the server device 12 to the subject vehicle. The image recognition logic reception part 42 receives the image recognition logic from the communication part 20. This corresponds to the fact that the image recognition logic reception part 42 receives the image recognition logic for image recognition of a predetermined object from the server device 12. The image recognition logic reception part 42 causes the storage part 24 to store the received image recognition logic.

In addition to the image recognition logic received by the image recognition logic reception part 42, the storage part 24 may store in advance an image recognition logic for the preceding vehicle and the pedestrian. The storage part 24 may store in advance an image recognition logic for recognizing traffic lights, road lanes, traffic signs, and the like. As will be described later, the storage part 24 stores the image recognition logic received by the image recognition logic reception part 42 for a certain period.

While performing image recognition of the preceding vehicle and the pedestrian, the image recognition part 44 loads the image recognition logic received by the image recognition logic reception part 42 and executes the image recognition logic to recognize an image of the object in the captured image. The loaded image recognition logic enables the image recognition part 44 to recognize the presence or absence of an object in a captured image, the number of objects in a captured image, the area of an object in a captured image, and the like. These are generically referred to as image recognition results. The image recognition part 44 may be, according to the type of the image recognition logic, a dedicated processor that executes a neural network or a general-purpose processor that loads and executes a RISC instruction or a CISC instruction.

The image recognition part 44 is supplied with data of a captured out-of-vehicle image of the vehicle 14 captured by the imaging part 26 including an in-vehicle camera or the like. The captured image is, for example, an image of the front side of the vehicle 14. An imaging time is attached to each frame of the captured image.

The image recognition part 44 recognizes the preceding vehicle and the pedestrian in the captured image using the image recognition logic for the preceding vehicle/pedestrian recognition stored in the storage part 24. Well-known techniques may be used for image recognition. The image recognition results of the preceding vehicle and the pedestrian are used for, for example, a well-known collision preventing function, automatic driving, and the like.

The image recognition part 44 may execute a plurality of image recognition logics in parallel. In addition, processing priorities of the image recognition logics executed in parallel may be the same or may be different. Processing may be performed based on the priority associated with the image recognition logic. For example, a frequency of image recognition per unit time of the image recognition logic for recognizing the preceding vehicle and/or the pedestrian may be higher than a frequency of image recognition per unit time of other image recognition logics. When an image recognition logic having a higher priority than the loaded image recognition logic is received, the image recognition part 44 may drive out the loaded image recognition part 44 and may alternatively load the image recognition part 44 with the acquired image recognition logic having the higher priority.

When the object is recognized by the image recognition part 44, the derivation part 46 derives information on the object based on the location information and the direction information, which are acquired by the vehicle information acquisition part 40, and the image recognition result obtained in the image recognition part 44. The information on the object includes, for example, an imaging point, a direction of the object at the imaging point, and an area of the object. The imaging point includes latitude and longitude. The imaging point is the location of the vehicle 14 at the time when the object is imaged. In other words, the information on the object includes the location information of the vehicle 14 at the time when the object is imaged. The location of the vehicle 14 at the time when the object is imaged may be substantially specified from the location information corresponding to an imaging time of a frame in the captured image in which the object is recognized. The direction of the object at the imaging point is represented by, for example, an angle of direction, and may be specified from the traveling direction of the vehicle 14 at the time when the object is imaged and the location of the object in the captured image. The area of the object may be derived from the image recognition result using well-known techniques.

The notification part 48 outputs the information on the object derived by the derivation part 46 to the communication part 20. The communication part 20 transmits the information on the object to the server device 12. This corresponds to the fact that the notification part 48 notifies the information on the object to the server device 12 via the communication part 20. The timing at which the notification part 48 notifies the information on the object is not particularly limited and may be, for example, a time when an accessory switch of the vehicle 14 is turned off. The timing at which the notification part 48 notifies the information on the object may vary depending on the object. For example, when the object is a flower or the like, it is not necessary to hurry the notification. Therefore, the notification timing is the time when the accessory switch of the vehicle 14 is turned off. When the object is a troubled car, a falling object on a road, a dent on a road, a flooded road, or the like, it is preferable that notification is made earlier. Therefore, the notification timing may be the time when the information on the object is derived.

Figure 3:
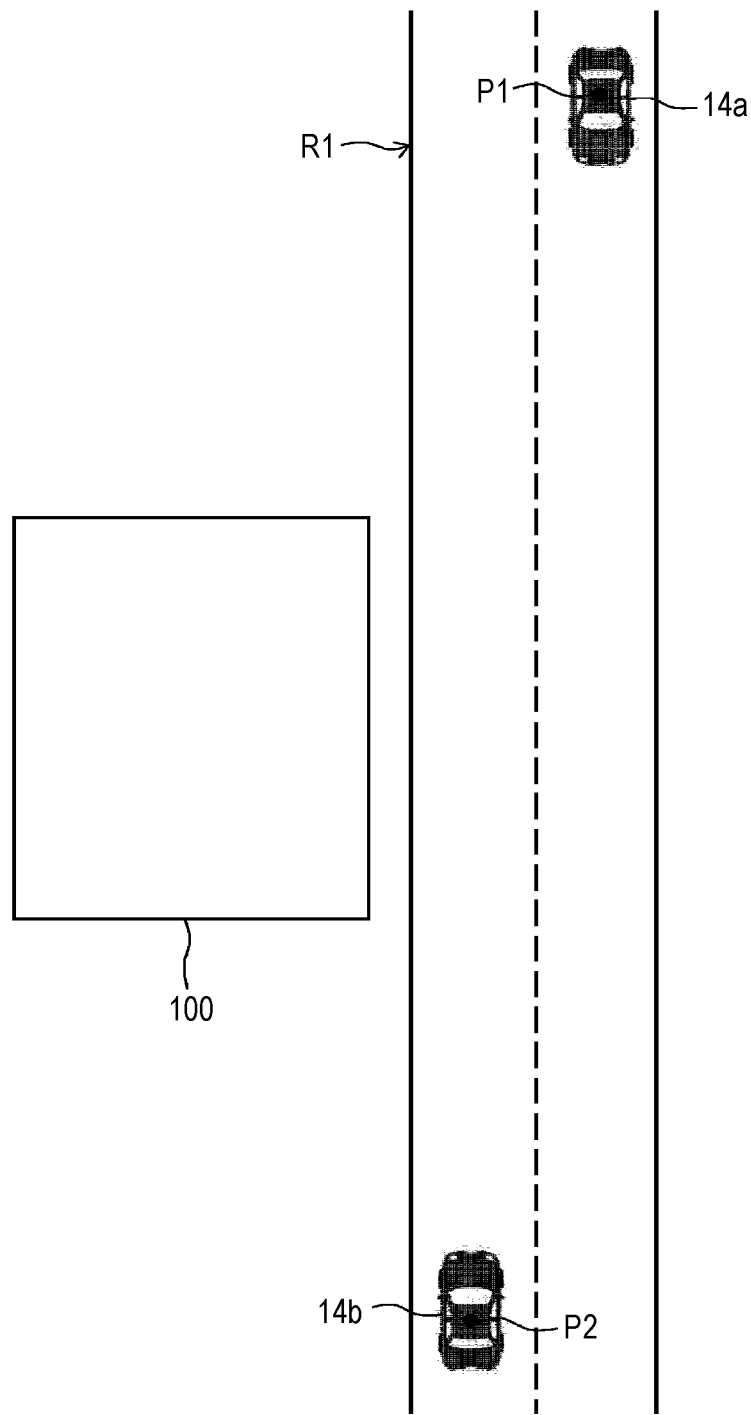
FIG. 3 is a diagram for explaining a situation in which a vehicle equipped with the in-vehicle device of FIG. 1 recognizes an image of an object.

FIG. 3 is a diagram for explaining a situation in which the vehicle 14 mounted with the in-vehicle device 10 of FIG. 1 recognizes an image of an object. In FIG. 3, a vehicle 14a is traveling from the north to the south on the road R1, and a vehicle 14b is traveling from the south to the north on a road R1. On the west side of the road R1, there is a region 100 in which blooming dandelion flowers are in clusters. The image recognition logic for dandelion flowers is distributed to the vehicle 14a and the vehicle 14b, respectively. The vehicle 14a and the vehicle 14b travel while periodically performing image recognition of dandelion flowers.

The location of the vehicle 14a when the dandelion flowers in the region 100 are image-recognized is the position P1. The derivation part 46 of the in-vehicle device 10 of the vehicle 14a derives the imaging point as the position P1 and derives the direction of the dandelion flowers at the imaging point as the southwest.

The location of the vehicle 14b when the dandelion flowers in the region 100 are image-recognized is the position P2. The derivation part 46 of the in-vehicle device 10 of the vehicle 14b derives the imaging point as the position P2 and derives the direction of the dandelion flowers at the imaging point as the northwest.

(3) Acquisition Process of Information on Object

Returning to FIG. 2, the communication part 60 of the server device 12 receives the information on the object from each vehicle 14 to which the image recognition logic has been distributed. The object information acquisition part 78 acquires information on the object received by the communication part 60. This corresponds to the fact that the object information acquisition part 78 acquires, from each vehicle 14 to which the image recognition logic has been distributed, the information on the object recognized by executing the image recognition logic in the captured out-of-vehicle image of the vehicle 14.

The derivation part 80 derives the location information of the object based on the imaging point and the direction of the object at the imaging point included in the information on the acquired object. The location information of the object includes latitude and longitude. Further, the derivation part 80 derives the existence range of the object based on the area of the object included in the information of the acquired object.

In the example of FIG. 3, the location of the object is in the southwest of the position P1 and in the northwest of the position P2. Therefore, it is derived that the location of the object is roughly on the west side of the position between the position P1 and the position P2.

The distribution part 76 distributes the derived location information of the object, the name of the object, and the existence range of the object to the plurality of vehicles 14 via the communication part 60.

Deletion of the image recognition logic will be described. The deletion is executed based on the instruction from the distribution part 76, the determination of the vehicle 14, or both. The deletion based on the instruction from the distribution part 76 will be described. When an acquisition termination condition of the information on the object is satisfied, the distribution part 76 distributes a deletion instruction of the image recognition logic to the vehicle 14 to which the image recognition logic has been distributed. When the acquisition termination condition is satisfied, the processing part 62 deletes the information for identifying the specified vehicle 14, which is stored in the storage part 64. The deletion based on the determination of the vehicle 14 will be described. If there is an expiration date associated with the image recognition logic, the image recognition logic is deleted when the current time exceeds the expiration date. If there is a period associated with the image recognition logic, the image recognition logic is deleted when the current time exceeds the period.

As a result of the execution of the deletion of the image recognition logic, the image recognition logic may be newly distributed to the vehicle 14. The acquisition termination condition is, for example, that the current date and time has passed a period related to the image recognition logic or that a certain period has elapsed from the distribution of the image recognition logic. In the case of the image recognition logic for flowers, the acquisition termination condition may be that a proportion of flowers in the image-recognized unit area exceeds a predetermined proportion. The certain period and the predetermined proportion may be appropriately determined by experiments or the like. The image recognition logic may be merely paused from execution without being deleted as data. For example, the paused image recognition logic is unloaded from the image recognition part 44, whereby resources of the image recognition part 44 are released correspondingly. The paused image recognition logic may be activated again and may be loaded into the image recognition part 44.

The in-vehicle device 10 will be described. The communication part 20 receives the distributed location information of the object, the name of the object, and the existence range of the object. Based on the information received by the communication part 20, the navigation part 32 displays the information on the object by superimposing the information on the object on a map, and notifies the occupant of the location, name, and existence range of the object. The information on the object may be displayed using an icon, or may be displayed using an icon and a character. The navigation part 32 may fully paint the existence range of the object on the map. When the location of the subject vehicle is close to the location of the object, the navigation part 32 may notify the occupant of the location, name, and existence range of the object by voice.

Further, the communication part 20 receives the deletion instruction of the image recognition logic distributed from the server device 12. The image recognition logic reception part 42 receives the deletion instruction of the image recognition logic received by the communication part 20. When the image recognition logic reception part 42 receives the deletion instruction of the image recognition logic, the processing part 22 deletes the image recognition logic stored in the storage part 24. As a result, the image recognition part 44 terminates the image recognition performed by this image recognition logic.

In the server device 12, when the object information acquisition part 78 does not acquire the information on the object from each vehicle 14 for a predetermined period after acquiring the information on the object from each vehicle 14 to which the image recognition logic has been distributed, the distribution part 76 distributes a notification termination instruction of the information on the object to the plurality of vehicles 14 via the communication part 60. The predetermined period may be appropriately determined by experiments or the like. The navigation part 32 of the in-vehicle device 10 terminates notification of the information on the object to the occupant when the communication part 20 receives the notification termination instruction of the information on the object.

This configuration can be realized by a CPU, memory, or other LSI of an arbitrary computer in terms of hardware, and can be realized by a program loaded into a memory or the like in terms of software. FIG. 2 illustrates functional blocks realized by the cooperation of the hardware and the software. Therefore, those skilled in the art will understand that these functional blocks can be realized in various forms by only the hardware, only the software, or a combination of the hardware and software.

Next, the overall operation of the vehicle system 1 having the above configuration will be described. FIG. 4 is a flowchart showing the distribution process of the image recognition logic in the server device 12 of FIG. 1. The process shown in FIG. 4 is performed in connection with each of the image recognition logics held by the server device 12. The specifying part 74 acquires information from the plurality of vehicles 14 (step S10), and specifies the vehicle 14 to which the image recognition logic is to be distributed, based on the acquired information (step S12). The distribution part 76 distributes the image recognition logic to the specified vehicle 14 (step S14).

FIG. 5 is a flowchart showing the image recognition process in the in-vehicle device 10 of FIG. 1. The image recognition logic reception part 42 receives the image recognition logic from the server device 12 (step S20), and the image recognition part 44 recognizes the object in the captured image using the received image recognition logic (step S22). When the object is not recognized (N in step S24), the process returns to step S22. When the object is recognized (Y in step S24), the derivation part 46 derives the information on the object based on the image recognition result (step S26), and the notification part 48 notifies the server device 12 of the derived information on the object (step S28).

FIG. 6 is a flowchart showing the process for acquiring the information on the object in the server device 12 shown in FIG. 1. The process of FIG. 6 is performed after the process of FIG. 4. The object information acquisition part 78 acquires the information on the object from each vehicle 14 to which the image recognition logic is distributed (step S40), the derivation part 80 derives the location information of the object (step S42), and the distribution part 76 distributes the derived location information of the object to the plurality of vehicles 14 (step S44).

As described above, according to the present embodiment, the image recognition logic is distributed to the specified vehicle 14, and the information relating to the object recognized in the captured image by executing the image recognition logic is acquired from each vehicle 14. Therefore, it is possible to cost-effectively collect information on various objects at various locations without incorporating in advance an image recognition logic specialized to each of the plurality of objects into the vehicle 14.

In addition, the specifying part 74 specifies the vehicle 14 possibly traveling in the region related to the image recognition logic. Therefore, the image recognition logic can be selectively distributed to the vehicle 14 that has a possibility to recognize an image of an object. Thus, it is possible to efficiently collect information on the object without wasting image recognition resources of the vehicle 14 that has no possibility to recognize an image of the object.

In addition, the specifying part 74 specifies the vehicle 14 possibly traveling in the region related to the image recognition logic during a period related to the image recognition logic. Therefore, the image recognition logic can be selectively distributed to the vehicle 14 having a higher possibility of image recognition of an object. Thus, even when a period of existence of an object is set, it is possible to efficiently collect information on the object without wasting image recognition resource of the vehicle 14 that has no possibility to recognize an image of the object.

In addition, the location information of the object is derived based on the location information of the vehicle 14 when the object is imaged, and the derived location information of the object is distributed to the plurality of vehicles 14. Therefore, occupants of the plurality of vehicles 14 can be notified of information on various objects at various locations. Consequently, it is possible to improve the convenience of the occupant of the vehicle 14.

Furthermore, when the condition for terminating the acquisition of the information on the object is satisfied, the deletion instruction of the image recognition logic is distributed to the vehicle 14 to which the image recognition logic has been distributed. Therefore, it is possible to effectively utilize image recognition resources of the vehicle 14.

Second Embodiment

The second embodiment differs from the first embodiment in that the server device 12 distributes the image recognition logic corresponding to the type of the processor constituting the image recognition part 44 of the in-vehicle device 10. Hereinafter, differences from the first embodiment will be mainly described.

The types of processors constituting the image recognition parts 44 of the in-vehicle devices 10 of the plurality of vehicles 14 are two or more. Therefore, there may be two or more types of processors of the image recognition parts 44 of the plurality of vehicles 14 specified by the specifying part 74. The storage part 64 of the server device 12 stores a plurality of image recognition logics, which can be executed by the image recognition parts 44 of different types of processors, for image recognition of a common object. For the respective objects, the storage part 64 stores a plurality of image recognition logics corresponding to such plural types of processors. In addition, the storage part 64 stores in advance a first table and a second table, which will be described below.

FIG. 7A is a diagram showing a data structure of the first table stored in the storage part 64 of the server device 12 according to the second embodiment. The first table shows a relationship between identification information of the vehicle 14 and a type of processor of the image recognition part 44 of the vehicle 14.

The identification information "Vehicle001" of a vehicle 14 is associated with the type "A" of the processor of the image recognition part 44 of the vehicle 14. The identification information "Vehicle002" of a vehicle 14 is associated with the type "B" of the processor of the image recognition part 44 of the vehicle 14.

Although not shown, the identification information of all the vehicles 14 of the vehicle system 1 and the types of the processors of the respective vehicles 14 are registered in the first table. When a new vehicle 14 is added to the vehicle system 1, the identification information and the like of the new vehicle 14 are registered in the first table.

FIG. 7B is a diagram showing a data structure of the second table stored in the storage part 64 according to the second embodiment. The second table shows a relationship between identification information of the image recognition logic and a type of the processor capable of executing the image recognition logic.

The identification information "Data001-A" of an image recognition logic is associated with the type "A" of the processor capable of executing the image recognition logic. The identification information "Data001-B" of an image recognition logic is associated with the type "B" of the processor capable of executing the image recognition logic. The image recognition logic of "Data001-A" and the image recognition logic of "Data001-B" are configured to perform image recognition of a common object.

The identification information "Data002-A" of an image recognition logic is associated with the type "A" of the processor capable of executing the image recognition logic. The identification information "Data002-B" of an image recognition logic is associated with the type "B" of the processor capable of executing the image recognition logic. The image recognition logic of "Data002-A" and the image recognition logic of "Data002-B" are configured to perform image recognition of a common object different from the object recognized by the image recognition logic of "Data001-A."

In this example, the image recognition logics having a common part such as "Data001" in the first half of the identification information are configured to perform image recognition of a common object. The image recognition logics that are different in the first half of the identification information are configured to perform image recognition of different objects.

Although not shown, the identification information of all the image recognition logics stored in the storage part 64 and the types of the processors capable of executing the respective image recognition logics are registered in the second table.

FIG. 7C is a diagram showing a data structure of the third table stored in the storage part 64 according to the second embodiment. The third table shows a relationship between the identification information of the vehicle 14 specified by the specifying part 74 and the identification information of the image recognition logic to be distributed to the vehicle 14 by the distribution part 76.

As in the first embodiment, the specifying part 74 specifies one or more vehicles 14 to which the image recognition logic for image recognition of a predetermined object is to be distributed. Described here is an example in which the specifying part 74 specifies the vehicles 14 having the identification information "Vehicle001" and the identification information "Vehicle002" as the vehicles 14 to which the image recognition logic having "Data001" in the first half of the identification information is to be distributed Based on the first table and the second table of the storage part 64, the specifying part 74 associates the identification information of each of the specified vehicles 14 with, among the plurality of image recognition logics stored in the storage part 64, the identification information of the image recognition logic executable by the image recognition part 44 of each vehicle 14, and stores the association results in the storage part 64 as the third table.

In the example of FIG. 7C, the image recognition logic of the identification information "Data001-A" executable by the type "A" of the processor of the vehicle 14 is associated with the identification information "Vehicle001" of the vehicle 14. The image recognition logic of the identification information "Data001-B" executable by the type "B" of the processor of the vehicle 14 is associated with the identification information "Vehicle002" of the vehicle 14.

Based on the third table of the storage part 64, the distribution part 76 distributes, to each vehicle 14 specified by the specifying part 74, the image recognition logic executable by the image recognition part 44 of the corresponding vehicle 14. In this example, the distribution part 76 distributes the image recognition logic having the identification "Data001-A" to the vehicle 14 having the identification information "Vehicle 001." The distribution part 76 distributes the image recognition logic having the identification information "Data 001-B" to the vehicle 14 having the identification information "Vehicle002." As a result, the vehicle 14 having the identification information "Vehicle001" and the vehicle 14 having the identification information "Vehicle002" perform image recognition of a common object.

Although not shown, when a plurality of vehicles 14 having the same type of processor is specified, the distribution part 76 distributes, to the plurality of specified vehicles 14, the same image recognition logic executable by the image recognition parts 44 of the plurality of vehicles 14.

According to the present embodiment, image recognition logics executable by the image recognition parts 44 of the vehicles 14 is distributed to the vehicles 14 specified by the specifying part 74. Therefore, it is possible to acquire information on an object from each vehicle 14 even if the types of the processors of the image recognition parts 44 of the plurality of vehicles 14 are two or more.

The disclosure has been described above based on the embodiments. The embodiments are nothing more than examples. It is to be understood by those skilled in the art that various modifications may be made in the combination of the respective components or the respective processing processes and that such modifications also fall within the scope of the disclosure.

What is claimed is:
1. A server device comprising:
   a specifying part configured to, based on information acquired from a plurality of vehicles, specify a distribution target vehicle to which an image recognition logic for image recognition of a predetermined object is to be distributed, among the plurality of vehicles;

a distribution part configured to distribute the image recognition logic to the distribution target vehicle specified by the specifying part; and an acquisition part configured to acquire information on the predetermined object from the distribution target vehicle to which the image recognition logic has been distributed, the information on the predetermined object being recognized by executing the image recognition logic on a captured out-of-vehicle image of the distribution target vehicle, wherein the image recognition logic is a neural network model or a program executed by a general-purpose processor, on which an image recognition algorithm is stored, wherein when an acquisition termination condition of the information on the predetermined object is satisfied, the distribution part distributes a deletion instruction of the image recognition logic to the distribution target vehicle to which the image recognition logic has been distributed, and wherein the image recognition logic is constituted by a learning network model.

2. The server device according to claim 1, wherein:

the information on the predetermined object includes location information of the distribution target vehicle when the predetermined object is imaged;

the server device further includes a derivation part configured to derive location information of the predetermined object based on the location information of the distribution target vehicle when the predetermined object is imaged; and the distribution part distributes the derived location information of the predetermined object to the plurality of vehicles.

3. A server device comprising:

a specifying part configured to, based on information acquired from a plurality of vehicles, specify a plurality of distribution target vehicles to which at least one image recognition logic for image recognition of a common or identical predetermined object is to be distributed, among the plurality of vehicles;

a distribution part configured to distribute the at least one image recognition logic to the plurality of distribution target vehicles specified by the specifying part; and an acquisition part configured to acquire information on the predetermined object from the plurality of distribution target vehicles to which the at least one image recognition logic has been distributed, the information on the predetermined object being recognized by executing the at least one image recognition logic on captured out-of-vehicle images of the plurality of distribution target vehicles, wherein the image recognition logic is a neural network model or a program executed by a general-purpose processor, on which an image recognition algorithm is stored, wherein when an acquisition termination condition of the information on the predetermined object is satisfied, the distribution part distributes a deletion instruction of the image recognition logic to the distribution target vehicle to which the image recognition logic has been distributed, and wherein the image recognition logic is constituted by a learning network model.

4. The server device according to claim 3, wherein:

each of the plurality of vehicles includes an image recognition part configured to execute the at least one image recognition logic;

the server device further includes a storage part configured to store a plurality of image recognition logics for image recognition of the common or identical predetermined object, the plurality of image recognition logics being executable by different types of image recognition parts; and the distribution part distributes, to each of the plurality of distribution target vehicles specified by the specifying part, one image recognition logic that is executable by the image recognition part of a corresponding one of the plurality of distribution target vehicles, among the plurality of image recognition logics stored in the storage part.

5. The server device according to claim 1, wherein the specifying part specifies the distribution target vehicle among vehicles possibly traveling in a region related to the image recognition logic.

* * * * *